United States Patent [19]

Solomon

[11] 4,370,284
[45] Jan. 25, 1983

[54] NON-BLEEDING ELECTRODE
[75] Inventor: Frank Solomon, Great Neck, N.Y.
[73] Assignee: Diamond Shamrock Corporation, Dallas, Tex.
[21] Appl. No.: 202,564
[22] Filed: Oct. 31, 1980
[51] Int. Cl.$^3$ ............................................. B29H 7/20
[52] U.S. Cl. ................................. 264/42; 252/425.3; 264/43; 264/44; 264/45.1; 264/61; 428/421
[58] Field of Search .................... 264/42, 43, 44, 45.1, 264/61, 63, 46.4, 127; 428/421; 252/425.3; 204/284, 294

[56] References Cited
U.S. PATENT DOCUMENTS

| | | | |
|---|---|---|---|
| 3,385,780 | 5/1968 | Feng | 204/294 |
| 3,838,064 | 9/1974 | Vogt et al. | 252/384 |
| 4,058,482 | 11/1977 | Baris | 252/425.3 |
| 4,091,176 | 5/1978 | Alfenaar | 252/425.3 |
| 4,135,995 | 1/1979 | Welch | 204/98 |
| 4,150,076 | 4/1979 | Baris et al. | 264/49 |
| 4,170,540 | 10/1979 | Lazarz et al. | 204/296 |
| 4,278,525 | 7/1981 | Gestant | 204/284 |
| 4,294,893 | 10/1981 | Iemmi et al. | 204/294 |
| 4,299,646 | 10/1981 | Sauer et al. | 428/421 |

FOREIGN PATENT DOCUMENTS 1284054 8/1972 United Kingdom .

OTHER PUBLICATIONS

Iliev, I., *Journal of Power Sources*, 1, "On the Effect of Various Active Carbon Catalysts on the Behavior of Carbon Gas-Diffusion Air Electrodes: 1, Alkaline Solutions", pp. 35–46, 1976/1977.

*Primary Examiner*—Donald E. Czaja
*Assistant Examiner*—W. Thompson
*Attorney, Agent, or Firm*—John P. Hazzard

[57] ABSTRACT

This disclosure is directed to a non-bleeding gas electrode for operation under the rigors of high current density and to the active layer thereof. This active layer is comprised of 60 to 90 weight percent high surface area, electroconductive carbon (with or without catalyst thereon), 10 to 40 weight percent particulate polytetrafluoroethylene (PTFE) and has pores sufficiently large to relieve internal hydrodynamic pressures thus preventing liquid being forced through the electrode wetproofing layer to the air side thereof. In addition such electrodes include a PTFE-containing wetproofing or backing layer secured on one side to said active layer and on the other side to a current distributor. The pores in both the active layer and the backing layer are controlled to relieve hydrodynamic pressures by coordinating the particle size of the pore former used to establish the pores in both said layers such that the repellancy of the backing layer to hot alkali exceeds the internal liquid pressures in the active layer.

Of particular significance is the fact that the present electrode is non-bleeding when operated on air and preserves its low voltage at high current density over extended time periods without bleeding.

22 Claims, No Drawings

NON-BLEEDING ELECTRODE

BACKGROUND OF THE INVENTION

Within the field of electrochemistry, there is a well-known type of an electrolytic cell known as a chlor-alkali cell. Basically this is a cell wherein chlorine gas and caustic soda, viz., sodium hydroxide, are produced by passing an electric current through a concentrated salt (brine) solution containing sodium chloride and water. A large portion of the chlorine and caustic soda for the chemical and plastics industries is produced in chlor-alkali cells. The cathodes employed in such chlor-alkali cells are subjected to the corrosive environment of the caustic soda.

Such cells are divided by a separator into anode and cathode compartments. The separator characteristically can be a substantially hydraulically impermeable membrane, e.g., a hydraulically impermeable cation exchange membrane, such as the commercially available NAFION ® manufactured by the E. I. duPont de Nemours & Company. Alternatively, the separator can be a porous diaphragm, e.g, asbestos, which can be in the form of vacuum deposited fibers or asbestos paper sheet as are well known in the art. The anode can be a valve metal, e.g., titanium, provided with a noble metal coating to yield what is known in the art as a dimensionally stable anode. One of the unwanted by-products present in a chlor-alkali cell is hydrogen which forms at the cell cathode. This hydrogen increases the power requirement for the overall electrochemical process, and eliminating its formation is one of the desired results in chlor-alkali cell operation.

Fairly recently, attention has been directed in chlor-alkali cell technology to various forms of oxygen (air) cathodes. Such cathodes can result in significant savings in the cost of electrical energy employed to operate chlor-alkali cells. Estimates indicate that there is a theoretical savings of about 25 percent of the total electrical energy required to operate chlor-alkali cells provided that the formation of hydrogen at the cathode can be prevented. In other words, about 25 percent of the electrical energy employed in a chlor-alkali cell is used to form hydrogen at the cathode. Hence, the prevention of hydrogen formation by forming hydroxide at the cathode results in significant savings in the cost of electrical power. This is the major benefit of and purpose for oxygen (air) cathodes. Such cathodes, being in contact with the electrolyte caustic soda, are subjected to the corrosive action thereof. Additionally, there are internal stresses and forces produced by the very reactions occurring at the cathode which tend to cause deterioration, break up of the active layer and bleed through of liquid in the wetproofing (backing) layer of such electrodes.

One known form of oxygen (air) cathode involves use of an active cathode layer containing porous active carbon particles whose activity in promoting the formation of hydroxide may or may not be catalyzed (enhanced) using precious metal catalyst materials, such as silver platinum, etc. Unfortunately, however, the pores of such active carbon particles may become flooded by the caustic soda thereby significantly reducing their ability to eliminate the formation of hydrogen at the cathode and resulting in decreased operating efficiency. Various attempts have been made to solve this wettability problem, e.g., by providing a backing layer which is hydrophobic to reduce the likelihood of wetting or flooding of the carbon particles in the active layer by the catholyte liquor. Various forms of polytetrafluoroethylene (PTFE) have been utilized for this purpose. With the use of PTFE, however, comes the problem of reduced electrical conductivity in the cathode active layer in as much as PTFE, per se, is nonconductive. Some oxygen (air) cathodes contain PTFE in both the active layer and in a backing sheet laminated thereto. Such PTFE has been employed in particulate or fibrillated (greatly attenuated and elongated) form to impart hydrophobicity to the desired layer. Thus it can be seen that the development of corrosion-resistant oxygen (air) cathodes of improved durability for use in conjunction with chlor-alkali cells is an overall objective in the field of electrochemistry.

PRIOR ART

U.S. Pat. No. 4,058,482, Baris et al, discloses an active layer sheet material principally comprised of a polymer such as PTFE and a pore-forming material wherein the sheet is formed of coagglomerates of the polymer and the pore former. This patent teaches mixing polymer particles with positively charged particles of a pore former, e.g., zinc oxide, to form coagglomerates thereof followed by mixing same with a catalyst suspension so as to form coagglomerates of catalyst and polymer-pore-former agglomerates followed by pressing, drying and sintering these coagglomerates. Subsequent to this sintering, the pore former can be leached out of the electrodes.

U.S. Pat. No. 4,150,076 (a division of U.S. Pat. No. 4,058,482) is directed to the process for forming the sheet of U.S. Pat. No. 4,058,482, said process involving formation of polymer-pore-former coagglomerates, distributing same as a layer on a suitable electrode support plate, for example, a carbon paper, to form a fuel cell electrode by a process which includes pressing, drying, sintering and leaching.

U.S. Pat. No. 4,170,540, Lazarz et al, discloses microporous membrane material suitable for electrolytic cell utilization and formed by blending particulate polytetrafluoroethylene, a dry pore-forming particulate material and an organic lubricant. These three materials are milled and formed into a sheet which is rolled to the desired thickness, sintered and subjected to leaching of the pore-forming material.

British Pat. No. 1,284,054, Boden et al, is directed to forming an air-breathing electrode containing an electrolyte within an air-depolarized cell. This air-breathing electrode is made by hot pressing a fluoropolymer sheet containing a pore-forming agent onto a catalyst composition (containing silver) and a metallic grid member. According to page 3 of said British patent, the PTFE-pore-forming agent-paraffin wax containing sheet is subjected to a solvent wash to remove the paraffin wax (lubricant and binder) and then sintered in a sintering furnace at the appropriate temperatures for sintering the fluorocarbon polymer. After the PTFE-containing sheet is sintered and while it still contains the pore-forming particles, it is then ready for application to the catalyst composition of the air electrode for the hot pressing operation. Hot pressing involves the use of pressures ranging from about 5,000 to about 30,000 psi in conjunction with temperatures ranging from about 200° F. to 400° F.

U.S. Pat. No. 3,385,780 to I-Ming Feng discloses a thin, porous electrode consisting of a thin layer of a polytetrafluoroethylene pressed against a thin layer of polytetrafluoroethylene containing finely divided platinized carbon, the platinum being present in amounts of 1.2 to 0.1 mg/cm$^2$ in the electrically conductive face of the thin electrode, viz., the side containing the platinized carbon, i.e., the active layer. A thermally decomposable filler material can be used, or the filler can be a material capable of being leached out by either a strong base or an acid. U.S. Pat. No. 3,385,780 also mentions a single unit electrode involving finely divided carbon in mixture with PTFE.

In accordance with one embodiment of this invention in respect of the backing layer, partially fluorinated acetylene black carbon particles of the formula $CF_x$ where $x=0.1$ to about 0.18 can be incorporated with the PTFE in the backing layer thereby resulting in improved electrical conductivity in the backing layer combined with balanced hydrophobicity. The $CF_x=0.1$ to about 0.18 carbon black materials possess hydrophobicity greater than carbon black, per se.

U.S. Pat. No. 4,135,995 to Cletus N. Welch is directed to a cathode having a hydrophilic portion formed of a solid intercalation compound of fluorine and carbon of the emperical formula $CF_x$, where x ranges from about 0.25 to 1 and preferably ranges from about 0.25 to 0.7. The intercalation compounds of carbon and fluorine are referred to as hydrophilic, fluorinated graphites and graphite fluorides characterized by an infrared spectrum showing an absorption band at 1220 cm$^{-1}$. A layer of hydrophobic material such as polyperfluoroethylene (polytetrafluoroethylene) can be utilized in a hydrophobic portion of the same layer or it can be utilized in the form of a different layer which can be associated with a current carrier layer. The Welch cathode may be utilized as an air (oxygen) cathode.

U.S. Pat. No. 3,838,064 to John W. Vogt et al is directed to a process for dust control involving mixing a finely divided fibrillatable polytetrafluoroethylene with a material which characteristically forms a dust to form a dry mixture followed by sufficient working to essentially avoid dusting. Very small concentrations of PTFE, e.g., from about 0.02 to about 3 percent by weight are employed to achieve the dust control. Corresponding U.S. Pat. No. 3,838,092 also to Vogt et al is directed to dustless compositions containing fibrous polytetrafluoroethylene in concentrations of about 0.02 percent to less than 1 percent, e.g., about 0.75 percent by weight of PTFE based on total solids.

An article entitled "ON THE EFFECT OF VARIOUS ACTIVE CARBON CATALYSTS ON THE BEHAVIOR OF CARBON GAS-DIFFUSION AIR ELECTRODES: 1. ALKALINE SOLUTIONS" by I. Iliev et al appearing in the *Journal of Power Sources*, 1 (1976/1977) 35, 46, Elseview Sequoia S.A., Lausanne-printed in the Netherlands, at pages 35 to 46 of said Journal describes double-layer, fixed-zone, Teflon-bonded carbon electrodes having a gas supplying layer of carbon black "XC" wetproofed with 35 percent Teflon and an active layer consisting of a 30 mg/cm$^2$ mixture of the same wetproof material "XC-35" and active carbon "weight ratio of 1:2.5." These electrodes were sintered at 350° C. under a pressure of 200 kg/cm$^2$ and employed as oxygen (air) cathodes in alkaline test environments.

DESCRIPTION OF THE INVENTION

In a laminated or sintered electrode having a carbon-containing active layer and a PTFE-containing backing layer, the hydrophobicity of the backing layer resists penetration of alkali from the active (operating) layer of the electrode through the backing layer. When alkali bleeds through the backing layer, it interferes with the contact of oxygen (coming from the backing layer side) with the catalyzed or uncatalyzed carbon particles in the active layer. If bleeding is very heavy, it covers up the back of the electrode preventing oxygen from contacting the active layer carbon particles. Such bleedthrough is symptomatic of adverse electrochemical condition in the electrochemical cell. In general, the bleedthrough problem is accentuated when operating an oxygen cathode on air, viz., $CO_2$-free air, which is less expensive than pure oxygen. Bleedthrough is particularly accentuated when operating an oxygen cathode on air under chlor-alkali cell conditions involving hot alkali, e.g., hot 30 percent NaOH (or equivalent alkali) especially at high current densities, e.g., 100 milliamperes/cm$^2$ and higher. Apparently the internal hydrodynamic (liquid) pressures in the working layer are higher under these operating conditions. In order to resist bleedthrough successfully, the inherent repellancy (hydrophobicity) of the backing layer must exceed the internal hydrodynamic pressures in the active layer. The present invention avoids bleeding of the alkali by preventing back-up pressure from building up in the active layer. The bleeding problem is overcome by coordinating and controlling the pore size (openings) in both the active and backing layers such that the internal hydrodynamic pressures in the active layer are less than that required to force liquid from the active layer through the pores of the hydrophobic backing layer. In other words, the size of the pores in the active layer and backing layer are controlled such that the repellancy of the backing layer to hot alkali exceeds the internal liquid pressures in the active layer. It is surprising that bleeding in the hydrophobic air diffusion backing layer can be prevented by providing large pores or openings in the active layer.

Pore size control in both the active and backing layers is achieved by use of a pore former comminuted to the desired particle size, the particle size of the pore former defining the pore size. So long as the pores in the active layer are large enough to prevent the development of backup pressures high enough to cause bleedthrough in the backing layer, the size of the pores in the backing layer are not critical. Characteristically the average size of the pores in the active layer will range from about 1 to about 40 microns and the active layer pores are at least as large as those in the backing layer. Accordingly the average pore size in the backing layer can range from about 1 to about 40 microns also. For most oxygen (air) cathodes, active layer pores of about 1 to about 20 microns coordinated with backing layer pores of about 1 to about 20 microns suffices to prevent electrode bleeding. According to one preferred embodiment of this invention, the average size of the pores in the active layer are larger than those in the backing layer with both being within the 1 to 20 micron size range.

In accordance with this invention, a variety of suitable carbon materials can be used. Such carbons include not only high surface area active carbons and carbon blacks but also partially fluorinated derivatives thereof, viz., materials of the formula $CF_x$, where x ranges from 0.1 to about 0.18. Such carbons include carbon blacks having a high surface area can be employed, viz., a B.E.T. surface area of from about 250 to 2,000 m$^2$/g (square meters/gram), and more usually from about 600 to about 2,000 m²/g, combined with a particle size ranging from 50 to 3,000 angstrom units. The expression "B.E.T. surface area" refers to the well-known Brunauer-Emmett-Teller method of determining surface area. The carbon blacks which can be used for this purpose embrace a broad spectrum of carbon black materials, e.g., those having a particle size ranging from about 5 to about 300 millimicrons. Such carbon blacks characteristically belong to a family of industrial carbons which includes lamp blacks, channel blacks, furnace blacks and thermal blacks. Insofar as its utilization herein, the term carbon black is as defined in the article entitled "FUNDAMENTALS OF CARBON BLACK TECHNOLOGY" by Frank Spinelli as appearing in the American Ink Maker, August, 1970.

Such suitable carbon blacks can be steam activated to enhance their surface area usually by contacting said carbon black with steam at temperatures of approximately 1,000° C. for a sufficient period of time to increase the surface area to the values contemplated herein, viz., 250 to about 2,000 m²/g or higher. Suitable carbon blacks include commercially available materials, such as "XC-72R" which is a carbon black manufactured by Cabot Corporation and has a B.E.T. surface area of approximately 260 m²/g before steam activation (at approximately 1,000° C.) and a steam-activated surface area ranging from about 1,000 to about 2,000 m²/g. Union Carbide Corporation "S-100" carbon is another carbon black which can be used in accordance with this invention. The aforementioned carbon blacks can, but do no necessarily, include spinel.

Another high surface area carbon black which can be used is the commercially available "Ketjenblack EC" sold by Armak Company of Burt, N.Y. (a part of Akzona Corporation). "Ketjenblack EC" has a B.E.T. surface area of approximately 1,000 m²/g.

As noted previously, the carbon particles in the active layer can be active carbon particles. The active carbon whose use is contemplated in accordance with this invention encompasses a variety of materials which in general, prior to the sequential deashing pretreatment, encompass a variety of amorphous carbonaceous materials, generally of vegetable origin which contain inorganic residue, e.g., noncarbonaceous oxides, collectively designed as ash.

In accordance with one embodiment of this invention, the active carbon starting material is "RB" carbon which is a form of active carbon manufactured by Calgon, a division of Merck, and is made from bituminous coal by known procedures. This material can contain as much as approximately 23 percent of various oxides and components which can be collectively classified as ash. Typical analysis of the ash contained in RB carbon is as follows:

| Component | Weight Concentration |
|---|---|
| Silica | 43.34 |
| Alumina (Al₂O₃) | 29.11 |
| Iron Oxides (Fe₂O₃) | 20.73 |
| Others | 6.82 |

The deashing sequential pretreatment (or conditioning) process is described and claimed in U.S. patent application Ser. No. 202,580 filed in the name of Frank Solomon of even date herewith and entitled "Active Carbon Conditioning Process." The disclosure of this application is incorporated herein by reference. Such deashing does not totally remove the ash content from the active carbon but results in a substantial reduction thereof, viz., from about 70 to 80 percent or more of the ash is removed by this process. The resulting deashed active carbon characteristically contains less than about 4 weight percent ash.

The initial stage of treatment constitutes contacting the active particles as obtained, e.g., RB carbon, as mentioned above, with either an acid or an alkali followed by contact with the other. For example, during the base contacting stage, the alkali material, such as sodium hydroxide, potassium hydroxide, etc., is maintained at elevated temperatures ranging from about 90° to about 140° C. and several contacting steps are used over time periods of, e.g., 0.5 to 25 hours, followed by one or more intermittent water washing step(s).

Then the thus treated active carbon is contacted with an acid, such as hydrochloric acid, for similar extended time periods at ambient temperatures. Between the alkali and acid contacting phases, the active carbon particles can optionally be dried. However, drying is not required.

Usually, the alkali is employed in the form of an aqueous solution containing from 28 to 55, and more usually from 35 to 45 weight percent alkali based on total solution.

The acid content of the aqueous acid solution customarily ranges from 10 to 30 weight percent and more usually from 15 to 25 weight percent acid based on total solution.

Prior to contact with the alkali solution, it has been found desirable to first comminute, e.g., ball mill or otherwise divide up the active carbon particles as purchased. For example, RB active carbon was ball milled for 2 to 6 hour, and more usually approximately 4 hours to reduce its particle size to the range of from about 5 microns to about 30 microns.

Usually the alkali washing stage is performed in several individual washing steps using a hot (100° to 130° C.) alkali solution. After the alkali washing has been completed, the alkali is neutralized using one or more water washing step(s) to remove the alkali prior to the acid wash stage.

Similarly, the acid washing stage can be accomplished in several discrete washing steps rather than all at one time. Additionally, the contact withe acid can be accomplished at lower temperatures for longer periods of time. For example, the acid wash can be conducted overnight (approximately 16 hours) at room temperature. As with the alkali contact stage preferably after the acid contact, the active carbon particles are subjected to a water washing to remove the acid followed by drying. Alternatively, the acid stage can be conducted at elevated temperatures using a Soxhlet extraction constant reflux apparatus, e.g., using HCl, HBr, etc., at 110° to 130° C. for about 0.5 hr., viz., constant boiling mineral acids, each having its respective boiling range. While many acids may suitably be employed, the acid of choice is hydrochloric acid.

The active carbon preferably has a paroicle size ranging from about 1 to about 50 microns, and more usually from about 10 to about 20 microns, an ash content of less than about 4 weight percent, and a B.E.T. surface area of from about 1000 m²/g and higher, e.g., 1000 to 2000+ m²/g.

The sequential conditioning or deashing pretreatment results in substantial reduction of the aforementioned ash content of the active carbon particle along with increases in surface area. Typically, when utilizing active carbon having an initial B.E.T. surface area of 600 to 1500 m$^2$/g (square meters per gram) of carbon before deashing and pretreating it with alkali and acid, reductions of ash content from about 12 weight percent to less than about 4 weight percent have been accomplished along with increases in surface area of up to 50 percent.

After deashing the active carbon to an ash content of less than about 4 weight percent, it can be catalyzed, e.g., with a precious metal, e.g., silver, by contacting the active carbon with a silver nitrate solution composed of silver nitrate salt dissolved in water as solvent therefore. Other suitable water-soluble silver (precursor) salts which can be employed in the deposition step include, but are not necessarily limited to, silver perchlorate, silver acetate, silver lactate, etc. According to a preferred embodiment of this invention, the active carbon is permitted to soak in the silver nitrate solution to adsorb and absorb silver nitrate over a period ranging from about 1.5 to 2.5 hours at ambient room temperatures. Also in accordance with a preferred embodiment of this invention, the soaking takes place at or near room temperature using water as the solvent for the silver nitrate. Preferably the concentration of silver nitrate in the water ranges from about 0.3 to about 0.35 molar. However, the silver nitrate concentration in the solvent can range anywhere from about 0.1 to 0.5 molar and usually ranges from about 0.2 to 0.4 molar silver nitrate.

The deashed active carbon particles having now chiefly adsorbed and to a much lesser extent absorbed the silver nitrate solution are then subjected to an excess liquid draining or removal step to help ensure that most of the silver remaining on these particles is adsorbed within the pores thereof thereby assisting in increasing the inside concentration of metallic silver upon subsequent chemical reduction.

Subsequent to the soak in silver nitrate to permit adsorption of the silver nitrate within the pores of the active carbon, the excess silver nitrate is filtered off the active carbon to recuce the amount of silver solution retained outside of the active carbon particles.

The chemical reduction step is conducted in the absence of bulk AgNO$_3$ solution using formaldehyde. In addition to formaldehyde, other suitable chemical reducing agents include, but are not necessarily limited to, sodium borohydride, hydrazine, substituted hydrazines, hydroxyl amines, viz., RNHOH compounds where R is an alkyl group containing from 1 to 3 carbon atoms. The filter cake obtained from filtering the active carbon was added to a hot, viz., from about 70° to about 95° C., and more preferably about 85° C., solution of alkaline formaldehyde accompanied with strong stirring, to effect chemical reduction of the silver nitrate to metallic silver. This process of preparing a silver-containing active carbon catalyst and the catalyst so obtained is described and claimed in U.S. patent application Ser. No. 202,579 filed in the name of Frank Solomon of even date herewith and entitled "Process For Catalyst Preparation." Of course, other precious metal catalyst materials can be deposited on the active carbon, e.g., platinum, can be applied according to the procedure set forth in U.S. Pat. No. 4,044,193.

ACTIVE LAYER

In order to form the active layer, the porous carbon particles are combined with a hydrophobic agent, preferably polytetrafluoroethylene (PTFE) in aqueous dispersion form. The particulate PTFE can have individual particle sizes ranging from about 0.05 to about 0.5 microns. It will be observed that the particle size of the PTFE particles is significantly smaller than that of porous active carbon particles but larger than that of porous high surface area carbon black particles. The carbon black or active carbon particles are combined intimately with the PTFE particles in a procedure referred to as "Teflonating."

In combining porous, high surface area carbon particles with the PTFE particles, more high surface area carbon is used than PTFE. Thus the concentration of PTFE in the carbon/PTFE mix ranges from about 10 to 40 weight parts of PTFE and from about 60 to 90 weight parts of high surface area carbon to make up 100 weight parts of mix upon drying. More usually, however, the concentration of PTFE ranges from about 20 to 35 weight parts per 100 weight parts of dried mix with the remaining about 65 to about 80 weight parts being high surface area carbon particles.

In accordance with one preferred embodiment of this invention, a mix of 65 weight parts of Union Carbide Corporation "S-100" carbon black having a B.E.T. surface area of approximately 600 m$^2$/g is combined with 35 weight parts of PTFE present in an aqueous dispersion known as "duPont TFE 30" dispersion by first placing the carbon black in isopropyl alcohol and then gradually adding the aqueous dispersion of PTFE particles to "Teflonate" the carbon black. Subsequently the "Teflonated" carbon black is dried to remove substantially all of the water therefrom and then redispersed in a lower alkyl alcohol, such as isopropanol. A pore-forming agent is added to the alcohol dispersion.

It is an essential feature of this invention that a pore former be incorporated in intimate mixture with the high surface area carbon/PTFE in the active layer of the electrode. In order to accomplish this, either a volatile fugitive pore former or a soluble fugitive pore former can be employed, viz., one capable of removal by heating or one capable of being dissolved out of the electrode. A variety of volatile and soluble pore-forming agents can be used. Where it is desired to use a volatile, pore-forming agent, ammonium benzoate, can be used. Soluble pore formers such as the water-soluble sodium carbonate are also suitable for use in this invention.

The procedure of incorporating the pore former will be described below in conjunction with carbon black, but it will be realized that a similar procedure can be used for active carbon. The pore former is combined with the high surface area carbon black/PTFE mix using from about 20 to about 80 weight parts of pore former and correspondingly from about 80 to about 20 weight parts of high surface area carbon/PTFE mix to achieve 100 weight parts of said mix including pore former. Usually, however, the concentration of pore former per 100 parts of mix plus pore former ranges from about 20 to about 60 weight parts.

The pore former, whose particle size can range from 1 to about 30 microns, is added gradually to the alcohol dispersion of "Teflonated" high surface area carbon black particles usually at ambient room temperatures, viz., about 15° to 25° C. for time periods sufficient to uniformly incorporate the pore former in the mix. The "wet" mix of pore former plus high surface area carbon black/PTFE is then ready for final processing to form the active layer or sheet.

The active layer or sheet can be formed by removing the water from the wet mix followed by drying it and then passing the dried mix through the nip of heated rollers usually heated to temperatures of 80° to 100° C. using nip gaps of 5 to 20 mils. In accordance with another embodiment of this invention, the active layer can be formed on a filter paper media substrate to which has been applied a release layer of salt, viz., sodium chloride. Sufficient pore former high surface carbon black/PTFE mix is deposited onto the salt-coated filter paper substrate to achieve active layer thickness ranging from about 5 to about 25 mils.

When in accordance with this invention it is desired to form a sintered electrode containing catalyzed carbon black particles in the active layer, the precious metal catalyst can be deposited on and/or within the high surface area carbon black particles, per se, usually prior to "Teflonation" thereof and prior to admixture with the pore-forming agent. Alternatively, the precious metal catalyst can be deposited on the formed active layer prior to combining with the backing layer and current distributor and sintering of the same.

In accordance with one preferred embodiment of this invention, the discrete high surface area carbon black particles are precatalyzed, viz., have a precious metal catalyst, e.g., Pt, deposited thereon prior to "Teflonation" and combining with the pore former. In accordance with such procedure, the platinum catalyst is derived from $H_3Pt(SO_3)_2OH$ by the procedure set forth in U.S. Pat. No. 4,044,193. This platinum precursor is then reduced to metallic platinum with the use of heat, or it can be done at ambient room temperatures using a reducing agent. After catalyzing, the high surface area carbon black particles are filtered and vacuumed-dried in preparation for "Teflonation" in the manner already described. Alternatively, a chloroplatinic acid platinum precursor can be employed to "precatalyze" the carbon black followed by chemical reduction using sodium borohydride or formaldehyde as the reducing agent.

In accordance with another embodiment of this invention, the catalyst can be applied to the carbon after formation of the active layer or sheet. This procedure is referred to as "post catalyzing" which in the case of deposition of a platinum catalyst is referred to as "post platinizing." The post platinizing can be performed in accordance with the procedure described and claimed in U.S. patent application Ser. No. 202,572, now abandoned filed of even date herewith in the name of Lawrence J. Gestaut and entitled "Post Platinizing High Surface Carbon Black." The disclosure of this application is incorporated herein by reference. Essentially this procedure involves placing the previously formed active layer sheet on a source of heat, e.g., a hot substrate, and applying thereto an alcohol solution of chloroplatinic acid containing about 0.1 ml of solution per $cm^2$ of active layer surface to be catalyzed while keeping said active layer surface hot and maintaining the temperature of the substrate at approximately 400° F. while the alcohol solution of chloroplatinic acid is deposited thereon, e.g., by brushing, spraying, etc. In such a "post platinizing" procedure, it is observed that the solvent virtually flashes off during application. This procedure is continued to deposit from 0.025 to about 0.75 mg of platinum per $cm^2$ of active layer surface. Deposition of the chloroplatinic acid or equivalent Pt precursor at these temperatures effects an initial reduction thereof to Pt which reduction is completed using, e.g., alkaline sodium borohydride. Alternatively the platinization can be performed while the active layer is still on the salt-coated filter paper by placing the salt paper with the active layer thereon on the hot plate and brushing the active layer side with the platinum coating solution. Alternatively the electrode can be laminated and then platinized prior to sintering same. The "post platinizing" procedure described herein permits obtaining very low loadings of platinum, e.g., from about 50 to about 100 micrograms of platinum per $cm^2$ of catalyzed active layer surface.

Of course, other precious metal catalysts can be used to enhance the catalytic activity of the high surface area carbon black contained in the active layer of the electrodes of this invention. Thus silver can be deposited on and/or within the high surface area carbon black particles, e.g., using a silver nitrate precursor solution followed by removal of excess silver nitrate solution and chemical reduction with alkaline formaldehyde solution.

In accordance with one embodiment of this invention, the "Teflonated," high surface area carbon black is heated before combining with the pore former to remove the bulk of the wetting agent employed to form the initial PTFE aqueous dispersion used for "Teflonation." This heating step can be conducted in air at temperatures ranging from about 250° to 325° C., more usually from about 275° to 300° C. for from 10 minutes to 1½ hours and more preferably from 20 minutes to 60 minutes. Alternatively the PTFE wetting agent can be removed by extracting it using chloroform ($CHCl_3$) in a Soxhlet extractor for 8 to 16 hours. Such procedure is described and claimed in U.S. patent application Ser. No. 202,584, now U.S. Pat. No. 4,338,181 filed in the name of Frank Solomon of even date herewith and entitled "Extraction Treatment."

BACKING LAYER

As previously noted, the active layer is combined with a PTFE backing layer and a current distributor to form the electrode. A variety of PTFE backing layers can be employed in the electrodes of this invention. Basically such backing layers contain PTFE and pore former material. Additionally such backing layers can contain carbon black to impart electroconductivity thereto.

In accordance with one embodiment of this invention, the backing layer can contain PTFE particles and pore former only. This backing layer is described and claimed in U.S. patent application Ser. No. 202,583, now U.S. Pat. No. 4,339,325 filed of even data herewith in the names of Frank Solomon and Charles Grun and entitled "Single Pass Process for Forming Electrode Backing Sheet."

According to another embodiment, the backing layer contains chiefly PTFE, pore former and carbon black and can be prepared as described in U.S. patent application Ser. No. 202,575 filed of even date herewith in the name of Frank Solomon and entitled "Electrode Backing Layer and Method of Preparing."

According to another embodiment, the backing layer is one containing PTFE, a pore former and a partially fluorinated carbon black of the formula $CF_x$, where x ranges from about 0.1 to about 0.18 and is described and claimed in U.S. patent application Ser. No. 202,582 filed of even date herewith in the names of Frank Solomon and Lawrence J. Gestaut and entitled "Electrode Backing Layer and Method of Preparing." The disclosure of these patent applications directed to preparing a backing layer are incorporated herein by reference.

The procedure described and claimed in Ser. No. 202,583, now U.S. Pat. No. 4,339,325, to prepare a backing layer containing only PTFE plus the pore former uses an aqueous dispersion of Teflon such as the duPont Teflon 6A series of dispersions. These are aqueous dispersions containing PTFE coagulates or agglomerates having a particle size of about 500 to 550 microns which were made by coagulating or agglomerating PTFE dispersed particles or about 0.05 to 0.5 microns and having an average particle size of about 0.02 microns. These agglomerates are dispersed in an organic liquid medium, usually a lower alkyl alcohol, such as isopropanol, and broken down by beating, e.g., in a high speed Waring blender for about 3 minutes to redispersed same and break up the larger particles into smaller particulate PTFE. Then pulverized sodium carbonate particles having particle size ranging from about 1 to about 40 microns, and more usually from about 1 to 20 microns, the average particle size as determined using a Fisher Sub Sieve Sizer, are added to the alcohol dispersion of the blended PTFE particles in a weight ratio ranging from about 30 to about 40 weight parts of PTFE to about 60 to about 70 weight parts of sodium carbonate to result in an intimate dispersion of PTFE with pore former. Then the alcohol is removed and the PTFE-sodium carbonate mix particles are dried.

Subsequent to drying, the particulate PTFE-sodium carbonate mixture is subjected to mixing under conditions which mildly "fiberize" (fibrillate) th PTFE. This can be done by sigma mixing the PTFE-sodium carbonate mix in a Brabender Prep Center Model D101 with attached sigma mixer Model 02-09-000 having a volume cavity of 650 ml with a charge of approximately 140 grams of said mix. This fibrillation is performed for approximately 10 to 20, e.g., 15 minutes, at 100 r.p.m.'s at temperatures of about 15° to 25° C., e.g., 20° C. The fibrillated mix is then chopped for from 1 to 20 seconds before rolling between heated rollers to form the PTFE/pore former sheet in one pass between the rolls. Characteristically, the rolls are metal, e.g., nickel, and are maintained at temperatures of from 70° to 90° C. using roll gaps ranging from about 5 to 10 mils.

When a balanced combination of electroconductivity with hydrophobicity is desired in the backing layer, either carbon black, per se, or partially fluorinated carbon blacks can be utilized to impart the conductivity to the PTFE-containing backing layer. A preferable form of unmodified (unfluorinated) carbon blacks for this purpose are the acetylene carbon blacks, viz., made from acetylene by continuous thermal decomposition, explosion, by combustion in an oxygen-deficient atmosphere, or by various electrical processes. Characteristically, these acetylene blacks contain 99.5+ weight percent carbon and have a particle size ranging from about 50 to about 2,000 angstrom units. The density of the acetylene black material is approximately 1.95 grams/cm$^3$. Suitable acetylene blacks are the commercially available acetylene blacks known by the designation "Shawinigan Black" and having an average particle size of about 0.025 microns. These acetylene blacks are somewhat hydrophobic, e.g., as demonstrated by the fact that the particles thereof float on cold water but quickly sink in hot water. The backing layers containing acetylene blacks are prepared by combining the PTFE in particulate form as a dispersion with the acetylene black particles followed by removal of the liquid and drying of the PTFE/carbon black mix particles. Approximately half of these particles can be fibrillated in accordance with the procedure described above and then mixed with unfibrillated PTFE particles. The pore-forming agent, e.g., sodium carbonate, is then incorporated with the mix of fibrillated PTFE/acetylene black/unfibrillated PTFE.

Such conductive PTFE/carbon black-containing backing layers characteristically have thicknesses of about 1 to 15 mils and can be produced by filtration of the PTFE/carbon blacks/pore-forming agent with mix on salt-coated filter paper or by passing said mix after drying through heated rollers at temperatures of 70° to 100° C. or by any other suitable technique for formation of an electroconductive backing layer.

Conductive backing layers containing partially fluorinated carbon blacks can also be employed. These partially fluorinated carbon blacks are compounds of the formula $CF_x$, wherein x ranges from 0.1 to about 0.18. These $CF_x=0.1$ to 0.18 partially fluorinated acetylene carbon blacks are more hydrophobic than acetylene blacks, per se. This was demonstrated from comparative experiments wherein the unfluorinated acetylene black particles floated on cold water but quickly sank in hot water versus the $CF_x=0.1$ to 0.18 partially fluorinated acetylene blacks which floated on hot water virtually indefinitely and could not be made to pierce the meniscus of the water.

Such hydrophobic electrode backing layers containing partially fluorinated carbon black are prepared by combining the PTFE in particulate form as a dispersion with the partially fluorinated acetylene black particles. Preferably, 20 percent of such particles have a particle size of approximately 500 angstrom units with the remainder having particle sizes of plus or minus 250 angstrom units as a standard deviation. Hence the preferred mean particle size of such particles is approximately 425 angstroms with the range of particle size being from about 50 to about 2000 angstroms.

These partially fluorinated carbon black particles are suspended in isopropyl alcohol and a dilute aqueous dispersion of PTFE (two weight percent PTFE) is added gradually thereto. This dilute dispersion is made from a PTFE dispersion of 60 weight parts of PTFE in water. Forty weight parts of 50 weight percent of this mixture is fibrillated as described above. The "Teflonated" partially fluorinated carbon black particles with a pore former added thereto are mixed, dewatered, dried and fibrillated as described above.

Subsequent to fibrillation, the fibrillated $CF_x0.1$ to 0.18/PTFE/pore former mix is further mixed with unfibrillated PTFE. Alternatively the pore former, e.g., sodium carbonate, can be added to the unfibrillated PTFE and thus mixed with the fibrillated, "Teflonated" carbon black component. This mix is dried, heated to remove the PTFE wetting agent, chopped and rolled into sheet form, or formed on salt-coated filter paper, to yield a coherent, self-sustaining wetproofing layer or sheet.

The testing of the partially fluorinated backing layers in their corrosive alkaline environment, such as occurs in a chlor-alkali cell, has revealed a desirable combination of electroconductivity with balanced hydrophobicity.

THE CURRENT DISTRIBUTOR

The current distributor utilized to form the electrodes of this invention can be any electroconductive, woven or nonwoven, symmetrical or asymmetric, wire mesh or grid. When the current distributor is asymmetric, it is preferably one which has an asymmetric woven wire mesh wherein a greater number of wires is oriented in a direction perpendicular to the major current distributor, viz., the current feeder bars and spanning the narrow part of the rectangular electrode. A smaller number of wire strands is arranged in the other, viz., horizontal, direction. In other words, in a preferred embodiment involving the use of an asymmetric woven wire mesh current distributor, the major current distributor supplies current to the periphery of the electrode. The majority of the current is supplied across the short dimension (vertical) in cases involving rectangular electrodes. Hence such asymmetric woven wire mesh current distributors have more fill wires than warp wires. Although any electroconductive material can be employed in the current distributor, preferably the wires of the mesh material are selected from the group consisting of nickel, nickel-plated copper, silver-plated nickel and silver-plated, nickel-plated copper, viz., copper wires that are first plated with nickel and then over plated with silver upon the nickel.

Such asymmetric woven wire mesh current distributors characteristically contain about twice as many wires in the vertical direction as are contained in the horizontal direction. Such a configuration reflects savings of approximately 50 percent in weaving time and 25 percent in material costs. The asymmetric woven wire mesh current distributors referred to hereinabove are described and claimed in U.S. patent application Ser. No. 202,574, now U.S. Pat. No. 4,354,917 filed in the name of Frank Solomon of even date herewith and entitled "Asymmetric Current Distributor." The disclosure of this application is incorporated herein by reference.

Alternatively the current distributor layer can be of the plaque type, viz., a comparatively compact yet porous layer, characteristically having porosities ranging from about 40 to 60 percent and made of copper, nickel, silver, titanium, iron, etc.

Plaque current distributor layers are usually from 10 to 30 mils in thickness and are well known in the art of electrochemistry.

Instead of a plaque-type current distributor, the electrodes of this invention can contain a symmetrical woven wire mesh distributor or one of the nonwoven or wire grid type, either symmetrical or asymmetric.

FORMING THE ELECTRODE

The electrodes are formed by either laminating, sintering under pressure or laminating followed by sintering. For example, these three-layer electrodes can be formed by placing the active layer, as described above, centrally located, viz., between the PTFE-containing backing layer on the one side and the current distributor layer on the other side. These three layers arranged as described above can be laminated utilizing temperatures of about 200° to 400° F. (93° to 205° C.) and pressures of from 0.5 to 10 T/in² to effect consolidation of the three layers. The three-layer assembly can be subjected to temperatures sufficient to effect sintering of the PTFE. Sintering temperatures can range from about 275° to 370° C. and more usually temperatures of about 340° to about 370° C. The sintering can be performed in conjunction with the use of pressures ranging from about 0.5 to 10 T/in² followed by removal from the pressing device. Also the assembly can be laminated as described to initially consolidate it followed by sintering with or without pressure.

It is essential to achieve the pore structure in the active layer of the electrodes that the laminating take place prior to removal of the aforementioned pore former from the active layer and backing layers of the electrode precursor to yield the electrode. The expression "electrode precursor" as used herein denotes the electrode which still contains the pore former which must be removed prior to use. The specific manner of removing the pore former will depend upon what type of pore-forming agent has been used. Thus if a soluble, viz., preferably water-soluble, pore-forming agent such as sodium carbonate has been used, it can be removed by one or more washings using water, preferably warm water at temperatures of 50° to 80° C.

In accordance with a preferred embodiment, which is described and claimed in U.S. patent application Ser. No. 202,573, now U.S. Pat. No. 4,357,262 filed in the name of Frank Solomon of even date herewith and entitled "Electrode Layer Treating Process," the sintered electrode is subjected to one or more hot soaks in an alkylene polyol, e.g., ethylene glycol, at temperatures of 50° to 100° C. before washing it in water. This hot soak enhances the resistance of the formed electrode to blistering during the subsequent water washings, which are employed to remove most of the soluble pore-forming agent.

The invention will be illustrated in further detail in the examples which follow in which all parts, percents and ratios are by weight unless otherwise indicated.

EXAMPLE 1

This example shows that when no pore former is used in the electrode active layer, bleeding of alkali occurs through the PTFE-containing backing layer at high current densities, regardless of whether the laminated three-layer electrode is subsequently sintered or not. Both electrodes were prepared using the same backing layers, active layers and woven wire mesh current distributors.

The PTFE-containing backing layers were prepared by the Single Pass process of Ser. No. 202,583, now U.S. Pat. No. 4,339,325, using a soluble pore former as follows:

Two hundred cubic centimeters of isopropyl alcohol were poured into an "Osterizer" blender. Then 49 grams of duPont 6A polytetrafluoroethylene were placed in the blender and the PTFE (alcohol dispersion) was blended at the "blend" position for approximately one minute. The resulting slurry had a thick pasty consistency. Then another 100 cc of isopropyl alcohol were added in the blender and the mixture was blended (again at the "blend" position) for an additional two minutes.

Then 91 grams of particulate sodium carbonate (ball milled and having an average particle size of approximately 3.5 microns, as determined by a Fisher Sub Sieve Sizer) were added to the blender. This PTFE-sodium carbonate mixture was then blended at the "blend" position in the "Osterizer" blender for 3 minutes followed by a higher speed blending at the "liquefying" position for an additional one minute. The resulting PTFE-sodium carbonate slurry was then poured from the blender onto a Buchner funnel and filtered and then placed in an oven at 80° C. where it was dried for 3 hours resulting in 136.2 grams yield of PTFE-sodium carbonate mixture. This mixture contained approximately 35 weight parts of PTFE and 65 weight parts of sodium carbonate.

This mixture was mildly fibrillated in a Brabender Prep Center with attached sigma mixer as described above.

After fibrillating, which compresses and greatly attenuates the PTFE, the fibrillated material is chopped to a fine dry powder using a coffee blender, i.e., Type Varco, Inc. Model 228.1.00 made in France. Chopping to the desired extent takes from about 5 to 10 seconds because the mix is friable. The extent of chopping can be varied as long as the material is finely chopped.

The chopped PTFE-$Na_2CO_3$ mix is fed to six inch diameter chromeplated steel rolls heated to about 80° C. Typically, these rolls are set at a gap of 0.008 inch (8 mils) for this operation. The sheets are formed directly in one pass and are ready for use as backing layers in forming electrodes, e.g., oxygen cathodes, with no further processing beyond cutting, trimming to size and the like.

Both active layers were prepared as follows: Commercially available steam treated "XC-72R" high surface area carbon black was platinized in accordance with the procedure of U.S. Pat. No. 4,044,193 using $H_3Pt(SO_3)_2OH$ to deposit approximately 5 percent Pt on the carbon black. This Pt catalyzed carbon black was then Teflonated as described previously in an ultrasonic generator to yield a wet mix containing 65 percent platinized carbon black and 35 percent PTFE. The wet mix was dried, extracted overnight with chloroform and then the active layers were formed by deposition on a layer of NaCl on filter paper in the shape of discs, each disc having 285 mg. of said mix. No pore former was used.

The current distributors were identical silver plated symmetrical woven nickel wire mesh with a 0.00025 inch thick silver plating on 0.005 inch diameter nickel mesh, viz., 50×50×0.005.

The active layer was placed in the middle between the current distributor and backing layer to form a sandwich assembly.

Both electrode precursor disc assemblies were respectively consolidated by laminating at 112° C. and a pressure of 5 tons/$in^2$ in a hydraulic press. On removal, the discs were soaked in hot ethylene glycol (75° C.) for 20 minutes and then washed in hot water (to remove pore former) and dried.

One electrode was then sintered in argon under a flat weight at 675° F. (357° C.) for 40 minutes. The other disc was not sintered.

Both electrode discs were then tested by immersion in transparent test cells containing hot (approximately 80° C.) 30 percent aqueous sodium hydroxide. Air ($CO_2$-free) was continuously fed to the backing layer (air) side of the cathode in an amount sufficient to equal approximately four (4) times the theoretically stoichiometric amount required to operate the cell during most of the tests. The current density (after start-up) was maintained at 100 milliamperes/$cm^2$ and higher, viz., varied up to 500 ma/$cm^2$ and then held at 250 ma/$cm^2$ for approximately 5 weeks (beginning about 21 hours after start-up).

The operating voltage (versus Hg/HgO reference electrodes) was noted for both test cells along with the current, and the cathodes were visually observed periodically for bleeding of the alkali through the backing layer. Table A gives results obtained with the unsintered electrode which weighed 1.536 g and had a thickness of 22 mils whereas Table B is directed to the results obtained from the sintered electrode which weighed 1.569 g and had a thickness of 24 mils. As will be noted from Tables A and B, both electrodes suffered bleedthrough although their electrical properties were satisfactory. Experience has indicated that bleedthrough hastens electrode deterioration, reduces efficiency and shortens electrode useful life over long periods of time.

TABLE A

| Day of Test | Time | −Voltage (Volts) | Current (Amperes) | Current Density (ma/$cm^2$) | Air Pressure (Feet of $H_2O$) | Visual Observation |
|---|---|---|---|---|---|---|
| Start | 4:28 p.m. | .150 | 0 | 0 | 0.5 | Dry |
| 1 | " | .260 | .25 | 40 | " | " |
| " | 4:51 p.m. | .165 | " | " | 0.6 | " |
| 2 | 8:45 a.m. | .065 | " | " | 0.3 | Bleeding in spots |
| " | " | .161 | .50 | 79 | " | Bleeding in spots |
| " | 9:00 a.m. | .159 | " | " | " | Bleeding in spots |
| " | " | .192 | .75 | 117 | " | Bleeding in spots |
| " | 9:15 a.m. | .191 | " | " | " | Bleeding in spots |
| " | " | .224 | 1.00 | 157 | " | Bleeding in spots |
| " | 9:35 a.m. | .212 | " | " | " | Bleeding in spots |
| " | " | .246 | 1.25 | 196 | " | Bleeding in spots |
| " | 9:50 a.m. | .241 | " | " | " | Bleeding in spots |
| " | " | .274 | 1.50 | 236 | " | Bleeding in spots |
| " | 10:05 a.m. | .254 | " | " | " | Bleeding in spots |
| " | " | .294 | 1.75 | 276 | " | Bleeding in spots |
| " | 10:20 a.m. | .275 | " | " | " | Bleeding in spots |
| " | " | .319 | 2.00 | 316 | " | Bleeding in spots |
| " | 10:35 a.m. | .304 | " | " | " | Bleeding in spots |
| " | " | .339 | 2.25 | 355 | " | Bleeding in spots |
| " | 10:50 a.m. | .322 | " | " | " | Bleeding in spots |
| " | " | .368 | 2.50 | 395 | " | Bleeding in spots |
| " | 11:05 a.m. | .352 | " | " | " | Bleeding in spots |
| " | " | .432 | 2.75 | 434 | " | Bleeding in spots |
| " | 11:20 a.m. | .401 | " | " | " | Bleeding in spots |

TABLE A-continued

| Day of Test | Time | −Voltage (Volts) | Current (Amperes) | Current Density (ma/cm²) | Air Pressure (Feet of H₂O) | Visual Observation |
|---|---|---|---|---|---|---|
| " | " | .502 | 3.00 | 474 | " | Bleeding in spots |
| " | 11:35 a.m. | .470 | " | 500 | " | Bleeding in spots |
| " | " | .535 | 3.17 | " | " | Bleeding in spots |
| " | 11:45 a.m. | .516 | " | " | " | Bleeding in spots |
| " | " | .173 | 1.60 | 250 | 1.4* | Bleeding in spots |
| " | 1:00 p.m. | .172 | " | " | 2.0 | Bleeding in spots |
| 7 | noon | .195 | " | " | 3.0 | Bleeding in spots |
| 9 | " | .191 | " | " | 2.4 | Bleeding in spots |
| 15 | 2:00 p.m. | .211 | " | " | 2.6 | Bleeding in spots |
| 18 | " | .193 | " | " | 3.5 | Bleeding in spots |
| 21 | 5:00 p.m. | .201 | " | " | 3.6 | Bleeding in spots |
| 24 | 11:30 a.m. | .203 | " | " | " | Bleeding in spots |
| 25 | 5:00 p.m. | .207 | " | " | 3.0 | Bleeding in spots |
| 28 | " | .197 | " | " | 3.7 | Bleeding in spots |
| 31 | 4:00 p.m. | .199 | " | " | 3.4 | Bleeding in spots |
| 35 | 2:00 p.m. | .197 | " | " | 3.7 | Bleeding in spots |
| 37 | 4:00 p.m. | .215 | " | " | 3.6 | Bleeding in spots |

*Air was fed at this stage in an amount sufficient to equal approximately four (4) times the theoretically stoichiometric amount necessary to operate an oxygen cathode.

TABLE B

| Day of Test | Time | −Voltage (Volts) | Current (Amperes) | Current Density (ma/cm²) | Air Pressure (Feet of H₂O) | Visual Observation |
|---|---|---|---|---|---|---|
| Start | 4:35 p.m. | .090 | 0 | 0 | 0.3 | Dry |
| 1 | " | .291 | .25 | 40 | " | " |
| " | 4:50 p.m. | .206 | " | " | " | " |
| 2 | 9:00 a.m. | .100 | " | " | " | Several small bleed through spots |
| " | " | .148 | .50 | 79 | " | Several small bleed through spots |
| " | 9:15 a.m. | .139 | " | " | " | Several small bleed through spots |
| " | " | .177 | .75 | 117 | " | Several small bleed through spots |
| " | 9:30 a.m. | .172 | " | " | " | Several small bleed through spots |
| " | " | .199 | 1.00 | 159 | " | Several small bleed through spots |
| " | 9:45 a.m. | .191 | " | " | " | Several small bleed through spots |
| " | " | .241 | 1.25 | 196 | " | Several small bleed through spots |
| " | 10:00 a.m. | .230 | " | " | " | Several small bleed through spots |
| " | " | .237 | 1.60 | 250 | 1.7* | Several small bleed through spots |
| " | 10:35 a.m. | .222 | " | " | " | Several small bleed through spots |
| " | 4:30 p.m. | .215 | " | " | 1.9 | Several small bleed through spots |
| 3 | 9:15 a.m. | .208 | " | " | 2.0 | Bleeding many spots |
| 4 | 2:00 p.m. | .205 | " | " | 2.1 | Bleeding many spots |
| 7 | 5:00 p.m. | .192 | " | " | 2.4 | Bleeding many spots |
| 10 | 11:30 a.m. | .191 | " | " | 3.0 | Bleeding many spots |
| 11 | 5:00 p.m. | .193 | " | " | 1.9 | Bleeding many spots |
| 14 | " | .195 | " | " | 1.9 | Bleeding many spots |
| 17 | 4:00 p.m. | .195 | " | " | 2.4 | Bleeding many spots |
| 21 | 2:00 p.m. | .198 | " | " | 2.0 | Bleeding many spots |
| 23 | 4:00 p.m. | .209 | " | " | 2.8 | Bleeding many spots |

TABLE B-continued

| Day of Test | Time | −Voltage (Volts) | Current (Amperes) | Current Density (ma/cm²) | Air Pressure (Feet of H₂O) | Visual Observation |
|---|---|---|---|---|---|---|
| 25 | noon | .207 | " | " | 2.1 | Bleeding many spots |
| 29 | 11:00 a.m. | .207 | " | " | 2.7 | Bleeding many spots |
| 32 | noon | .184 | " | " | 2.3 | Bleeding many spots |
| 35 | " | .171 | " | " | 2.0 | Bleeding many spots |
| 37 | 4:00 p.m. | .190 | " | " | 2.7 | Bleeding many spots |
| 43 | 10:00 a.m. | .199 | " | " | 2.6 | Bleeding many spots |
| 46 | " | .191 | " | " | 1.9 | Bleeding many spots |
| 49 | 9:00 a.m. | Current Off (Power Outage; Heater On) | | | | |
| " | 11:00 a.m. | .208 | " | " | 2.0 | Bleeding many spots |
| 51 | 1:00 p.m. | .205 | " | " | 2.1 | Bleeding many spots |
| 53 | 11:00 a.m. | .204 | " | " | 2.0 | Bleeding many spots |
| 56 | 10:00 a.m. | .195 | " | " | 2.5 | Bleeding many spots |
| 58 | 4:00 p.m. | .201 | " | " | 1.9 | Bleeding many spots |
| 60 | " | .201 | " | " | 1.9 | Bleeding many spots |
| 62 | 2:00 p.m. | .199 | " | " | 1.7 | Bleeding many spots |
| 65 | 10:00 a.m. | .181 | " | " | 2.1 | Bleeding many spots |
| 66 | 3:00 p.m. | .191 | " | " | 1.8 | Bleeding many spots |
| 69 | noon | .205 | " | " | 2.1 | Bleeding many spots |
| 72 | 10:00 a.m. | .206 | " | " | 1.9 | Bleeding many spots |
| 74 | 1:00 p.m. | .848** | " | " | 1.9 | Bleeding many spots |
| 75 | 1:35 p.m. | Filled bath with hot 30% NaOH | | | | |
| " | 2:35 p.m. | .007 | 0 | 0 | 0.3 | Bleeding |
| " | " | .131 | .25 | 40 | " | " |
| " | 3:25 p.m. | .109 | " | " | " | " |
| 76 | 8:45 a.m. | .114 | " | " | " | " |
| " | " | .142 | .50 | 79 | " | " |
| " | 9:00 a.m. | .139 | " | " | " | " |
| " | " | .161 | .75 | 117 | " | " |
| " | 9:15 a.m. | .158 | " | " | " | " |
| " | " | .176 | 1.00 | 157 | " | " |
| " | 9:30 a.m. | .191 | " | " | " | " |
| " | " | .192 | 1.25 | 196 | " | " |
| " | 9:45 a.m. | .185 | " | " | " | " |
| " | " | .204 | 1.60 | 250 | 1.2 | " |
| " | 11:45 a.m. | .206 | " | " | " | " |
| " | 4:30 p.m. | .201 | " | " | " | " |
| 77 | 1:00 p.m. | .191 | " | " | 2.0 | " |
| 79 | 10:00 a.m. | .193 | " | " | 1.8 | " |
| 81 | noon | .196 | " | " | 2.6 | " |
| 86 | 10:00 a.m. | .192 | " | " | 2.0 | " |
| 88 | 3:00 p.m. | .192 | " | " | 2.8 | " |
| 90 | 10:00 a.m. | .199 | " | " | 2.0 | " |
| 93 | 3:00 p.m. | .197 | " | " | " | " |
| 95 | 4:00 p.m. | .196 | " | " | " | " |
| 96 | 4:00 a.m. | Power Failure: Air, Heat & Current Off | | | | |
| 97 | 8:10 a.m. (Power On) | .195 | 1.60 | 250 | 2.0 | |
| " | 6:00 p.m. | Began reheating; 7:10 p.m. Started one hour scan. The term "scan" refers to gradually raising the current over the stated period of time. | | | | |
| 99 | 3:00 p.m. | .197 | 1.60 | 250 | 2.0 | |
| 101 | 9:00 a.m. | .194 | " | " | " | |
| 103 | 4:00 p.m. | .198 | " | " | 2.7 | |
| 105 | " | .202 | " | " | 2.5 | |
| 107 | 11:00 a.m. | .199 | " | " | 1.9 | |
| 109 | " | .208 | " | " | " | |
| 111 | " | .211 | " | " | 1.7 | |
| 114 | " | .218 | " | " | " | |
| 116 | 3:00 p.m. | .209 | " | " | " | |
| 121 | 10:00 a.m. | .205 | " | " | 2.4 | |
| 123 | 2:00 p.m. | .203 | " | " | 1.8 | |
| 125 | 10:00 a.m. | .205 | " | " | 1.7 | |
| 128 | " | .206 | " | " | 1.9 | |

**Accidental very high current pulse (approximately two seconds); cell shut off to wash out electrode in bath overnight; dry weight of electrode equals 1.596 g.

EXAMPLE 2

Laminated, unsintered and sintered electrodes, respectively, were prepared as in Example 1 using identical backing layers, active layers and current distributors, as in Example 1, except that both active layers were prepared containing approximately 25 percent of ball milled sodium carbonate having an average particle size of about 5 microns. The PTFE wetting agent was removed from the active layer mix by overnight extraction with chloroform before adding the sodium carbonate. Both assemblies were prepared with the active layer in the middle.

Both electrode discs were laminated at 8.5 Tons/in² pressure and 240° F. (116° C.) in a hydraulic press to consolidate the layers. Before testing, both electrode precursors were hot soaked in ethylene glycol at 75° C. for 20 minutes and then washed in water to remove most of the pore former (sodium carbonate) from both the backing and active layers. Then one electrode was additionally sintered at 357° C. for 40 minutes in argon as in Example 1.

Both electrodes were tested in hot (80° C.) 30 percent NaOH at the below tabulated current densities. Air (CO₂-free) was supplied at four times the theoretical requirement for most of the test as was the case in Example 1. Table C gives the specific test results for the sintered electrode which weighed 1.712 g. and had a thickness of 24 mils. Both electrodes ran for the approximately 93-day test period without bleeding, viz., the backing layer on the air side remained dry for the duration of the test.

TABLE C

| Day of Test | Time | −Voltage (Volts) | Current (Amperes) | Current Density (ma/cm²) | Air Pressure (Feet of H₂O) | Visual Observation |
|---|---|---|---|---|---|---|
| Start | 1:40 p.m. | Filled with hot 30% NaOH | | | — | — |
| 1 | 2:40 p.m. | .059 | 0 | 0 | 0.6 | Backing Dry |
| " | " | .244 | .25 | 40 | " | Backing Dry |
| " | 3:15 p.m. | .144 | " | " | " | Backing Dry |
| " | 4:30 p.m. | .126 | " | " | " | Backing Dry |
| 2 | 9:00 a.m. | .093 | " | " | " | Backing Dry |
| " | " | .131 | .50 | 79 | " | Backing Dry |
| " | 9:15 a.m. | .127 | " | " | " | Backing Dry |
| " | " | .155 | .75 | 117 | " | Backing Dry |
| " | 9:30 a.m. | .154 | " | " | " | Backing Dry |
| " | " | .173 | 1.00 | 157 | " | Backing Dry |
| " | 9:45 a.m. | .168 | " | " | " | Backing Dry |
| " | " | .189 | 1.25 | 196 | " | Backing Dry |
| " | 10:00 a.m. | .179 | " | " | " | Backing Dry |
| " | " | .207 | 1.50 | 236 | " | Backing Dry |
| " | 10:15 a.m. | .203 | " | " | " | Backing Dry |
| " | " | .220 | 1.75 | 276 | " | Backing Dry |
| " | 10:30 a.m. | .208 | " | " | " | Backing Dry |
| " | " | .228 | 2.00 | 316 | " | Backing Dry |
| " | 10:50 a.m. | .216 | " | " | " | Backing Dry |
| " | " | .209 | 1.60 | 250 | 1.5 | Backing Dry |
| " | 11:20 a.m. | .204 | " | " | " | Backing Dry |
| " | 2:20 p.m. | .197 | " | " | " | Backing Dry |
| 3 | 9:00 a.m. | .184 | " | " | 1.7 | Backing Still Dry |
| 4 | 10:00 a.m. | .179 | " | " | " | Backing Still Dry |
| 9 | " | .175 | " | " | 2.2 | Backing Still Dry |
| 12 | " | .172 | " | " | 2.5 | Backing Still Dry |
| 15 | 11:00 a.m. | .167 | " | " | " | Backing Still Dry |
| 17 | 1:00 p.m. | .169 | " | " | 2.4 | Backing Still Dry |
| 19 | 11:00 a.m. | .162 | " | " | 2.9 | Backing Still Dry |
| 22 | 10:00 a.m. | .156 | " | " | 2.6 | Backing Still Dry |
| 24 | 4:00 p.m. | .168 | " | " | 2.5 | Backing Still Dry |
| 26 | 2:00 p.m. | .162 | " | " | 2.6 | Backing Still Dry |
| 29 | 11:00 a.m. | .170 | " | " | 2.5 | Backing Still Dry |
| 30 | 3:00 p.m. | .169 | " | " | 2.6 | Backing Still Dry |
| 33 | noon | .169 | " | " | 2.3 | Backing Still Dry |
| 36 | 10:00 a.m. | .169 | " | " | 2.7 | Backing Still Dry |
| 38 | 3:00 p.m. | .168 | " | " | 2.8 | Backing Still Dry |
| 40 | noon | .170 | " | " | 2.6 | Backing Still Dry |
| 43 | 10:00 a.m. | .167 | " | " | 2.4 | Backing Still Dry |
| 45 | noon | .180 | " | " | 1.7 | Backing Still Dry |
| 50 | 10:00 a.m. | 1.63 | " | " | 2.1 | Backing Still Dry |
| 52 | 3:00 p.m. | .157 | " | " | 1.8 | Backing Still Dry |
| 54 | 10:00 a.m. | .173 | " | " | 2.4 | Backing Still Dry |
| 57 | 3:00 p.m. | .163 | " | " | 2.0 | Backing Still Dry |
| 59 | 4:00 p.m. | .174 | " | " | 2.3 | Backing Still Dry |
| 60 | 4:00 a.m. | Power Failure; Air, Heat & Current Off | | | | |
| 61 | 8:10 a.m. | .181 | 1.60 | 250 | 2.4 | Backing Still Dry |
| " | 6:00 p.m. | Began reheating; 7:10 p.m. Started 1 hour scan | | | | |
| " | 8:25 p.m. | .173 | — | — | 2.6 | Backing Still Dry |
| 63 | 3:00 p.m. | .175 | 1.60 | 250 | 2.3 | Backing Still Dry |
| 65 | 10:00 a.m. | .186 | " | " | 2.2 | Backing Still Dry |
| 67 | 4:00 p.m. | .165 | " | " | 2.4 | Backing Still Dry |
| 69 | " | .176 | " | " | " | Backing Still Dry |
| 71 | 11:00 a.m. | .188 | " | " | " | Backing Still Dry |
| 73 | 1:00 p.m. | .105 | " | " | 2.9 | Backing Still Dry |
| 75 | 11:00 a.m. | .184 | " | " | 2.6 | Backing Still Dry |
| 78 | " | .188 | " | " | 2.7 | Backing Still Dry |
| 79 | 8:15 a.m. | .186 | " | " | 2.5 | Backing Still Dry |
| | (Current, Air and Heat Off) | | | | — | Backing Still Dry |
| " | 12:15 p.m. | Began reheating; Air On | | | — | Backing Still Dry |

TABLE C-continued

| Day of Test | Time | −Voltage (Volts) | Current (Amperes) | Current Density (ma/cm$^2$) | Air Pressure (Feet of H$_2$O) | Visual Observation |
|---|---|---|---|---|---|---|
| " | 1:23 p.m. | Current On | | | — | Backing Still Dry |
| " | 1:25 p.m. | .210 | 1.60 | 250 | 1.5 | Backing Still Dry |
| " | 2:00 p.m. | .181 | " | " | " | Backing Still Dry |
| 80 | 3:00 p.m. | .181 | " | " | 2.5 | Backing Still Dry |
| 85 | 10:00 a.m. | .181 | " | " | " | Backing Still Dry |
| 86 | 9:00 a.m. | .169 | " | " | 2.5 | Backing Still Dry |
| (Heat, Air and Current Off) | | | | | | |
| " | 1:00 p.m. | Began reheating: Air On | | | — | Backing Still Dry |
| " | 1:35 p.m. | Current On | | | | |
| " | " | .189 | 1.60 | 250 | 2.5 | Backing Still Dry |
| " | 2:15 p.m. | .177 | " | " | 2.6 | Backing Still Dry |
| 87 | 2:00 p.m. | .188 | " | " | 1.9 | Backing Still Dry |
| 89 | 10:00 a.m. | .187 | 1.60 | 250 | 2.1 | Backing Still Dry |
| 92 | " | .203 | " | " | 2.3 | Backing Still Dry |
| 93 | 8:15 a.m. | .197 | " | " | 2.7 | Backing Still Dry |
| (Air, Heat & Current Off - Test ended later same day) | | | | | | |

Example 2 clearly demonstrates that by providing sufficiently large pores in the active layer, the bleeding problem (evident with the electrodes of Example 1) can be overcome.

What is claimed is:

1. An electrode precursor consisting essentially of a hydrophobic backing layer containing polytetrafluoroethylene and a pore former, an active layer containing high surface area carbon particles and a pore former and a current distributor wherein the average particle size of said active layer pore former ranges from about 1 to about 40 microns and is sufficiently large to relieve internal liquid pressures generated in said active layer during use thereof after removal of said pore formers.

2. An electrode precursor as in claim 1 wherein said active and backing layer pore former is a soluble pore former.

3. An electrode as in claim 2 wherein said soluble pore former is sodium carbonate.

4. An electrode precursor as in claim 1 wherein said active and backing layer pore former is a volatile pore former.

5. An electrode precursor as in claim 4 wherein said volatile pore former is ammonium benzoate.

6. An electrode precursor as in claim 1 wherein said high surface area carbon is carbon black.

7. An electrode precursor as in claim 1 wherein said high surface area carbon is active carbon.

8. An electrode precursor as in claim 1 wherein said high surface area carbon contains a precious metal catalyst.

9. An electrode precursor as in claim 1 wherein said active layer additionally contains polytetrafluoroethylene.

10. An electrode precursor as in claim 1 which is sintered.

11. An electrode precursor as in claim 1 wherein said active layer is between said backing layer and said current distributor.

12. A method for making a non-bleeding electrode comprising preparing a backing layer containing polytetrafluoroethylene and a pore former; preparing an active layer containing high surface area carbon particles and a pore former wherein the average particle size of said active layer pore former ranges from about 1 to about 40 microns and is sufficiently large to relieve internal liquid pressures generated in said active layer during use; assembling said backing layer with said active layer and a current distributor; consolidating said assembly; and removing said active and backing layer pore former.

13. A method as in claim 12 wherein said active layer is assembled between said backing layer and said current distributor.

14. A method as in claim 12 wherein the average pore size of said backing layer pores ranges from about 1 to about 40 microns.

15. A method as in claim 14 wherein the average pore size of said active layer pores is at least as large as the average pore size of said backing layer pores.

16. A method as in claim 15 wherein the average pore size of said active layer pores is larger than the average pore size of said backing layer pores.

17. A method as in claim 12 wherein said active and backing layer pore former is a soluble pore former.

18. A method as in claim 17 wherein said pore former is sodium carbonate.

19. A method as in claim 12 wherein said active and backing layer pore former is volatile pore former.

20. A method as in claim 19 wherein said volatile pore former is ammonium benzoate.

21. A method as in claim 12 which includes sintering said consolidated assembly after removal of said pore former.

22. A method as in claim 12 wherein said active layer additionally contains polytetrafluoroethylene.

* * * * *